J. A. RICKETTS.
REEL FOR FISH RODS.
APPLICATION FILED JAN. 18, 1910.
1,046,647.
Patented Dec. 10, 1912.
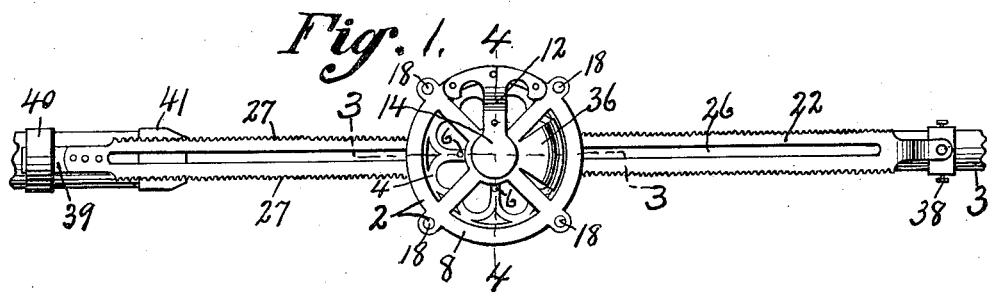
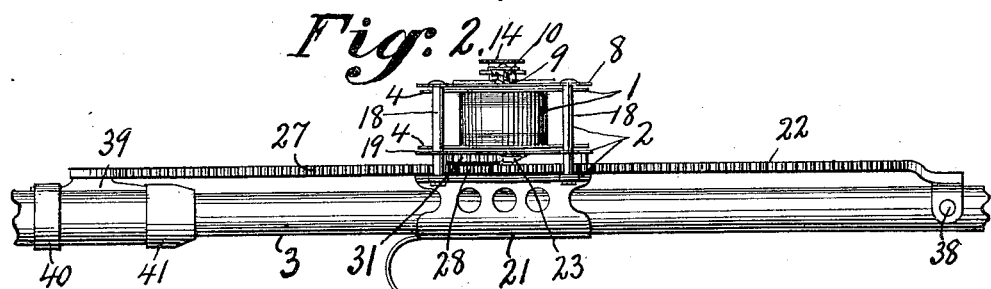
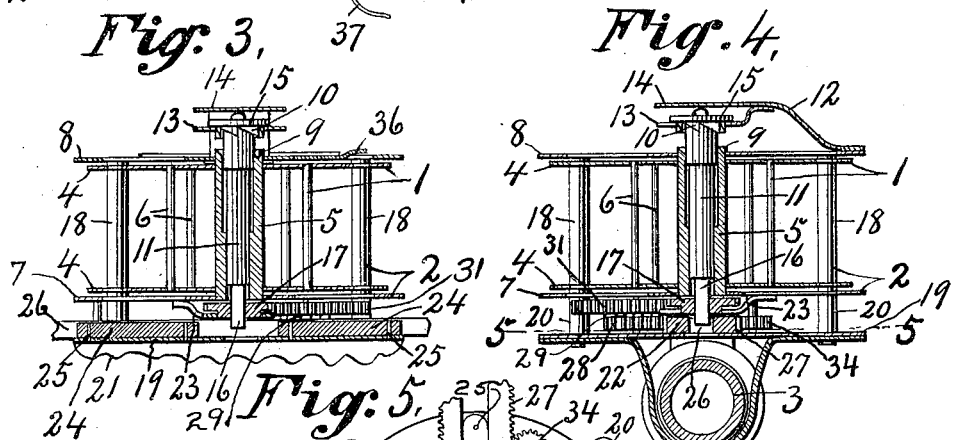
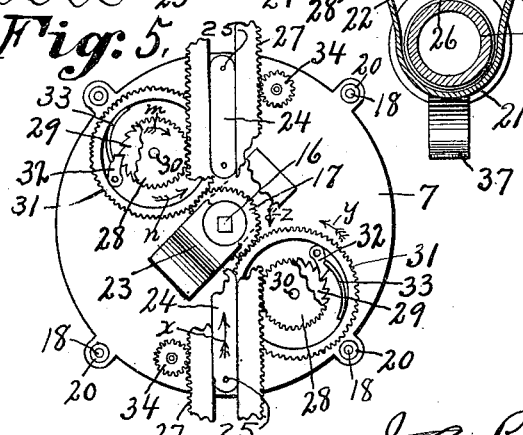
Witnesses
Edward J. Stout
H. E. Chase
Inventor
J. A. Ricketts
By Howard P. Denslow
Attorney
COLUMBIA PLANOGRAPH CO., WASHINGTON, D. C.

UNITED STATES PATENT OFFICE.

JOHN ASA RICKETTS, OF ITHACA, NEW YORK.

REEL FOR FISH-RODS.

1,046,647.  Specification of Letters Patent. Patented Dec. 10, 1912.

Application filed January 18, 1910. Serial No. 538,612.

*To all whom it may concern:*

Be it known that I, JOHN A. RICKETTS, of Ithaca, in the county of Tompkins, in the State of New York, have invented new and useful Improvements in Reels for Fish-Rods, of which the following, taken in connection with the accompanying drawings, is a full, clear, and exact description.

This invention relates to certain improvements in fish line reels and while it is particularly adapted to be used in connection with fish rods, it may be mounted on any other support and in other relations where a free reel and rapidity of action in winding a line upon the reel may be desired. Reference is had to my pending application #617,716, filed March 29, 1911.

The main object is to mount the reel upon its supporting frame in such manner as to be normally free and at the same time to provide means under the control of the operator whereby the line may be rapidly wound upon the reel by the reciprocal movement of the reel supporting frame along the fish rod or other suitable support, through comparatively short strokes thereby obviating the laborious and slow action of the usual crank lever.

Another object is to provide the reel supporting frame with a simple and convenient means for frictionally retarding the action of the free reel in unwinding the line therefrom.

A further object is to provide means within easy reaching distance of the handle of the fish rod for preventing reciprocal action of the reel supporting frame when desired.

Other objects and uses relating to specific parts of the device will be brought out in the following description.

In the drawings: Figures 1 and 2 are respectively a top plan and a side elevation of a portion of a fish rod and my improved reel mounted thereon. Figs. 3 and 4 are enlarged sectional views taken respectively on lines 3—3 and 4—4, Fig. 1. Fig. 5 is an inverted plan, partly broken away and partly in section, taken on line 5—5, Fig. 4, showing particularly a portion of the toothed rack, gear train and ratchet and pawl connections for transmitting rotary motion from the rack to the rotary reel actuating member, as the reel frame is moved back and forth along the rack.

In illustrating the operation of my invention, I have shown a reel —1— and supporting frame —2— therefor as mounted for reciprocal movement upon and along a fish rod —3— and adapted to coact with suitable mechanism brought into action by such reciprocal motion for imparting rotary motion to the reel.

The reel —1— preferably consists of parallel circular disks —4— spaced some distance apart and rigidly connected by a central hub —5— and a concentric series of line supporting tie rods —6—.

The hub —5—, which is tubular, is journaled at its opposite ends to parallel frame plates or disks —7— and —8—, the outer end of said hub projecting some distance through the outer disk —8— and is provided with clutch teeth —9— adapted to be engaged by a movable clutch section —10—. This clutch section is rigidly secured to a rotary axially movable spindle —11— and is normally held out of engagement with the clutch section —9— by means of a retracting spring —12— having a forked arm —13— and finger piece —14—.

The head of the clutch section —10— is provided with an enlarged annular flange —15— which is interposed between the forked arm —13— and finger piece —14—, so as to hold the clutch —10— and spindle —11— in their normal position and still permit their free rotation.

The spindle —11— is journaled in the hub —5— and is provided at its inner end with a reduced angular portion —16— which is slidably fitted in a corresponding aperture of a pinion —17— so as to permit free axial movement of the spindle relatively to the pinion and at the same time to impart rotary motion from the pinion to the spindle.

The frame plates or disks —7— and —8— are located respectively at the inner and outer ends of the reel and are held a fixed distance apart by stay-bolts or tie-rods —18—. The frame —2— is also provided with a base plate —19— spaced apart some distance from and between the plate —7— and fish rod —3— where it is held in place parallel with the plate —7— by the tie bolts —18— and suitable spacing sleeves —20—.

Secured to the inner face of the base plate —19—, preferably by the tie bolts —18—, is a hand plate —21— having its central portion looped around and embracing the fish rod —3— with sufficient clearance to permit free lengthwise reciprocal movement of the hand plate without friction on the rod.

*Mechanism for rotating the reel.*—The reel supporting frame is mounted upon and movable lengthwise of a supporting bar —22— running parallel with and having its opposite ends secured to the fish rod —3— and its intermediate portions spaced apart a sufficient distance therefrom to receive and permit the free action of the base plate —19— which is interposed between said bar and the adjacent side of the fish rod and preferably bears against the under side of the bar —22—. The pinion —17— is located just above the supporting bar —22— between the frame plate —7— and a yoke —23— which is secured to the under side of the plate —7— and embraces a hub of the pinion —17— and also bears against the upper face of the bar —22—. The reel supporting frame is therefore held in place upon the bar by the base plate —19— and yoke —17— which are slidably engaged with opposite faces of said supporting bar to permit the frame to be moved back and forth along the bar and fish rod, said frame being additionally guided in its lengthwise movement by ribs —24— which are secured to the upper face of the base plate —19— by rivets —25— and ride in a lengthwise slot —26— running lengthwise through the center of the bar —22— nearly its entire length, said slot also receiving the lower end of the angular shank —16— of the spindle —11—.

Any suitable mechanism may be employed for imparting rotary motion to the spindle —11— and its clutch —10— by the reciprocal movement of the reel supporting frame along the fish rod and guide bar —22— and to this end I have shown said bar —22— having its opposite longitudinal edges provided with parallel toothed racks —27— which mesh with rotary pinions —28—, which together with suitable coaxial ratchet wheels —29— are secured to rotary spindles —30— and located at opposite sides of the guide bar —22— between the plates —7— and —19— in which the spindles —30— are journaled.

Loosely mounted on the spindles —30— adjacent to the ratchet wheels —29—, are gears —31— having pawls —32— pivoted thereto and spring pressed against the teeth of the ratchet wheels —29— by springs —33— also secured to the gears —31—. These gears —31— are of the same diameter and mesh with diametrically opposite sides of the pinion —17— so as to impart rotary motion to said pinion and also to the spindle —11— which is slidably interlocked therewith, the inner portions of the gears —31— overlapping upon the outer face of the bar —22—.

The pinions —28— engage their respective racks —27— directly opposite the guide ribs —24— which latter fit with an easy sliding action in the slot —26— and serve to prevent springing of the racks or sides of the bar —22— by the engagement of the pinions —28— therewith. As a further means for preventing lateral springing of the bar, I provide idler pinions —34— which are located at opposite sides of the bar —22— and mesh with the corresponding racks —27—, said idlers being mounted upon suitable spindles which are journaled in the plates —7— and —19—, as clearly shown in Figs. 4 and 5.

Each ratchet wheel and its pawl constitutes an individual driving means for transmitting motion from the pinion —28— to the corresponding gear —31— and thence to the spindle —11— through the medium of the spindle —17—, said ratchet wheels and their pawls being arranged so that as the reel frame is moved in one direction the teeth of one of the ratchet wheels will engage the corresponding pawl and operate the adjacent gear —31—, while the other pawl will simply trail backwardly over the teeth of its ratchet wheel, the reverse action taking place when the reel supporting frame is moved in the opposite direction. For example, if the reel supporting frame is moved in the direction indicated by arrow —*x*—, Fig. 5, the right hand pinion —28— and corresponding ratchet wheel —29— and gear —31— will be rotated in the direction indicated by arrow —*y*—, thereby rotating the pinion —17— and spindle —11— in the direction indicated by arrow —*z*—. During this action the left hand pinion —28— and ratchet wheel —29— will be rotated in the direction indicated by arrow —*m*—, while the corresponding gear —31— will be rotated in the direction indicated by arrow —*n*—, thus causing the teeth of the left hand ratchet wheel to ride under the pawl, while at the same time the pawl rides in the opposite direction over the teeth of the ratchet wheel.

It will be clear from the foregoing description, that by moving the reel supporting frame in the opposite direction from that indicated by arrow —*x*— the action of the pinions —28— and their respective ratchet wheels —29— will be reversed while the gears —31— and pinion —17— will be rotated in the same direction. It therefore follows that the spindle —11— will always be rotated in the same direction by the reciprocal movement of the reel supporting frame along the fish rod.

As previously intimated, the clutch —10— is movable into and out of engagement with the clutch teeth —9— on the end of the hub —5— of the reel —1— being normally held out of engagement by the spring —12—, but may be forced into locking engagement with said hub by inward pressure of the finger of the finger piece —14—, thereby effecting the rotation of the reel in one and the same direction as the reel supporting frame is moved along the fish rod —3— and bar —22—. On the other hand, when pressure upon the spring arm —12— is released, the clutch —10— is returned to its normal position out of interlocking engagement with the hub of the reel thereby allowing said reel to rotate freely or to remain at rest even though the spindle —11— may be rotated by the backward and forward movement of the reel supporting frame.

In order that the free rotation of the reel may be retarded, as for instance when the line is being drawn out by a fish, the upper plate —8— is provided with a movable brake section —36— normally spring pressed outwardly by its own tension away from the adjacent reel disk —4—, but adapted to be pressed inwardly by the finger of the operator against the outer face of said disk when desired to stop or retard the rotation of the reel.

It is desirable to hold the reel supporting frame against reciprocal action during the operation of fishing and for this purpose the lower side of the loop —21— is provided at one end, nearest the handle, with a finger hook —37— adapted to be engaged by the finger of the operator to hold said frame in one position.

The ends of the rack bar —22— may be secured to the fish rod in any desired manner and, in this instance, I have shown the front end as held in place by a pin or rivet —38— passing into or through the fish rod, while the rear end is provided with a suitable foot —39— held in place by rings —40— and —41— one of which may be movable lengthwise of the bar to disengage the foot and permit the rack to be removed after removing the pin —38— and detaching the guide loop —21— from the base plate —19—.

The reel frame is reciprocated along the rod —3— by grasping it in one (usually the right) hand with the fingers engaged with the underside of the loop —21— and the thumb engaged with the finger piece —14— to enable the operator to force the clutch section —10— into engagement with the clutch section —9— to lock the reel to its driving spindle —11—, the fish rod being held by the handle in the other or left hand.

What I claim is:

1. In combination with a fish rod, a reel supporting frame movable in reverse directions along and upon the exterior of the rod, a reel mounted in the frame wholly to one side of the rod, a guide bar for the reel frame attached to the exterior of the rod at the same side as the reel, and connections between the reel and guide rod for rotating the reel in one and the same direction as it is reciprocated along the guide rod.

2. In combination with a fish rod, a toothed rack detachably mounted on the exterior of the rod lengthwise thereof, movable means for holding said rack against endwise movement relatively to the rod, a reel supporting frame movable in reverse directions along the rack, a reel on the frame wholly to one side of the rod, connections between the reel frame and rack for guiding said frame in its reciprocal movement, and additional connections between the reel and rack for rotating said reel in one and the same direction as the reel frame is reciprocated.

3. In combination with a fish rod, a reel supporting frame movable in reverse directions lengthwise of and upon the rod, a driving shaft disposed at substantially right angles to the axis of the rod, connections between the rod and driving shaft for imparting a rotary motion to said driving shaft as the frame is moved in either direction, a spool journaled upon and rotatable independently of the driving shaft, and clutch connections between the driving shaft and spool.

4. In combination with a fish rod, a relatively stationary toothed rack mounted upon and extending lengthwise of the rod, a reel supporting frame movable along the rack, a driving shaft disposed at substantially right angles to the rack, connections between the driving shaft and rack for imparting a rotary motion to said driving shaft as the frame is moved along the rack, a spool journaled upon and rotatable independently of the shaft, and clutch connections between the shaft and spool.

5. In combination with a fish rod, a reel supporting frame movable in reverse directions along and upon the rod, a driving shaft disposed at substantially right angles to the axis of the rod, connections between the driving shaft and rod for imparting a rotary motion to said shaft as the frame is moved in either direction along the rod, a spool journaled upon and rotatable independently of the shaft, and means operable at will for locking the shaft to the spool.

6. In combination with a fish rod, a guide bar extending lengthwise of and upon the exterior of the rod and having its intermediate portions spaced apart therefrom, a reel supporting frame movable in reverse directions lengthwise of and upon the bar and having sliding interlocking connection therewith, a reel mounted in the frame wholly at one side of the rod and comprising a driving spindle, and a spool journaled thereon, connections between the bar and spindle for rotating said spindle in one and the same direction as the reel frame is reciprocated, and clutch connections between the spindle and spool.

7. In combination with a fish rod, a bar detachably secured to the rod wholly at one side thereof and having its opposite longitudinal edges provided with toothed racks, a reel supporting frame movable lengthwise of and upon the bar and having a portion thereof embracing the rod, a reel mounted in the frame wholly at one side of the rod and comprising a driving spindle and a spool rotatable relatively thereto, clutch connections between the spindle and spool, and separate connections between the spindle and toothed racks for rotating said spindle in one and the same direction as the reel frame is reciprocated along the bar.

8. In combination with a fish rod, a bar detachably secured to the rod and having the greater portion thereof spaced apart therefrom, said bar having its opposite longitudinal edges provided with toothed racks, a reel supporting frame movable in reverse directions lengthwise of and upon the bar, a reel mounted in the frame wholly at one side of the rod and comprising a driving spindle and a spool, gears mounted on the reel frame and meshing with the toothed racks, and connections between said gears and driving spindle for rotating the latter in one and the same direction as the reel frame is reciprocated along the bar.

9. In combination with a fish rod, a guide bar detachably secured to the rod wholly at one side thereof and having the greater portion thereof spaced apart therefrom, said bar having its opposite longitudinal edges provided with toothed racks and its central portion provided with a lengthwise slot, a reel supporting frame movable in reverse directions along and upon the bar and provided with guide members movable in said slot, a reel mounted in the frame wholly at one side of the rod and comprising a driving spindle and a spool rotatable relatively thereto, clutch connections between the driving spindle and spool, a pinion on the driving spindle, gears meshing with diametrically opposite sides of the pinion, additional gears meshing with the toothed racks, and separate clutch connections between the first named gears and corresponding last named gears for rotating the driving spindle in one and the same direction as the reel supporting frame is moved in reverse directions along the bar.

10. In combination with a fish rod, a reel-supporting frame movable in reverse directions along the rod, a rotary spindle disposed at substantially right angles to and wholly at one side of the rod and having its inner end provided with a gear and its outer end provided with a clutch section, a reel coaxial with and surrounding the spindle between said gear and clutch section and also having its outer end provided with a clutch section, connections between the gear and rod for imparting rotary motion to the spindle, and means for engaging the clutch sections with each other.

In witness whereof I have hereunto set my hand on this eighth day of January, 1910.

JOHN ASA RICKETTS.

Witnesses:
 HENRY L. COLE,
 FRANK M. GOFF.

---

Copies of this patent may be obtained for five cents each, by addressing the "Commissioner of Patents, Washington, D. C."